(12) United States Patent
Oda et al.

(10) Patent No.: US 7,083,222 B2
(45) Date of Patent: Aug. 1, 2006

(54) MOUNTING STRUCTURE OF WEATHER STRIP

(75) Inventors: Hiromu Oda, Hiroshima (JP); Kouji Nawate, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 43 days.

(21) Appl. No.: 11/018,502

(22) Filed: Dec. 21, 2004

(65) Prior Publication Data

US 2005/0189783 A1  Sep. 1, 2005

(30) Foreign Application Priority Data

Mar. 1, 2004  (JP)  ............... 2004-056724

(51) Int. Cl.
*B60J 10/08* (2006.01)
(52) U.S. Cl. .................................. 296/146.9; 49/498.1
(58) Field of Classification Search ............. 296/146.9; 49/493.1, 498.1, 492.1
See application file for complete search history.

(56) References Cited

U.S. PATENT DOCUMENTS

| | | | | |
|---|---|---|---|---|
| 5,205,075 | A * | 4/1993 | Moyer | 49/493.1 |
| 5,242,208 | A * | 9/1993 | Ohya | 296/146.9 |
| 5,307,591 | A * | 5/1994 | Usuta et al. | 49/476.1 |
| 5,322,402 | A * | 6/1994 | Inoue | 411/510 |
| 5,367,830 | A * | 11/1994 | Omura et al. | 49/498.1 |
| 5,383,701 | A * | 1/1995 | Okada | 296/146.9 |
| 5,389,409 | A * | 2/1995 | Iwasa et al. | 49/498.1 |
| 5,429,467 | A * | 7/1995 | Gugle et al. | 411/182 |
| 5,527,583 | A * | 6/1996 | Nozaki et al. | 296/146.9 |
| 5,791,722 | A * | 8/1998 | Nozaki et al. | 296/146.9 |
| 5,806,914 | A * | 9/1998 | Okada | 296/146.9 |
| 5,918,421 | A * | 7/1999 | Nozaki | 49/498.1 |
| 5,964,496 | A * | 10/1999 | Nozaki et al. | 296/146.9 |
| 6,039,391 | A * | 3/2000 | Takahashi | 296/218 |
| 6,601,346 | B1 * | 8/2003 | Nozaki | 49/498.1 |
| 6,641,204 | B1 * | 11/2003 | Ogawa et al. | 296/146.9 |
| 6,814,382 | B1 * | 11/2004 | Kohara et al. | 296/1.03 |
| 6,820,372 | B1 * | 11/2004 | Nozaki | 49/498.1 |
| 6,848,218 | B1 * | 2/2005 | Langemann | 296/146.9 |
| 6,938,378 | B1 * | 9/2005 | Nozaki et al. | 49/498.1 |

FOREIGN PATENT DOCUMENTS

JP  10-220436  8/1998

* cited by examiner

*Primary Examiner*—Kiran B. Patel
(74) *Attorney, Agent, or Firm*—Frishauf, Holtz, Goodman & Chick, P.C.

(57) ABSTRACT

There is provided a mounting structure of a weather strip comprising a weather strip 2 mounted on a door panel 1A or a body panel 1B of an automobile. The weather strip 2 comprises a fin portion 4 formed in a die molded part 3 of the weather strip 2 to cover existing holes 1b or mounting holes 1a formed in the panel 1, an insert plate 6 mounted in the fin portion 4, a locking projection 7 protrudely formed from the insert plate 6 and projects out of the fin portion 4, and an engagement member 8 attached to the locking projection 7 capable of disconnecting. The engagement member 8 is inserted into a existing hole 1b or an mounting hole 1a formed in the panel 1 for an engagement and to mount the weather strip 2 on the panel 1.

4 Claims, 4 Drawing Sheets

MOUNTING STRUCTURE OF WEATHER STRIP

BACKGROUND OF THE INVENTION

This invention relates to a mounting structure of a weather strip which is mounted on a door panel or a body panel of an automobile, and which, besides a sealing function, comprises a fin portion in a die molded part thereof in order to cover holes, e.g., access holes, formed in the panel.

There have been provided, for example, access holes in an interior side of a door panel of an automobile for a use of adjusting such as a door glass elevation mechanism. And, there has been a weather strip which is mounted on the door panel, and which comprises a fin portion in a die molded part thereof for an application of covering the holes.

The fin portion of the weather strip is mounted on the door panel, and the mounting operation in most cases is carried out with clips or a double-sided adhesive tape. A shape of the clip is introduced, for example, in the Japanese Unexamined Patent Publication No. 10-220436

However, the conventional weather strip whose fin portion is mounted on the panel with the clips has a problem that an outlook thereof is deteriorated since head portions of the clips are exposed.

Further, the conventional weather strip whose fin portion is mounted with the double-sided adhesive tape has also a problem that the weather strip is inclined to be placed inaccurately since the double-sided adhesive tape is not provided with a positioning function like the clip.

SUMMARY OF THE INVENTION

It is therefore an object of this invention to provide a mounting structure of a weather strip in which a weather strip mounted on a door panel or a body panel of an automobile—which comprises, besides a sealing function, a fin portion in a die molded part of the weather strip for an application of covering holes, e.g., access holes which are formed in the panel—can be accurately placed on a proper position without losing an outlook thereof.

In order to achieve the above mentioned object, a first aspect of the invention provides a mounting structure of a weather strip comprising a weather strip (2) mounted on a door panel (1A) or a body panel (1B) of an automobile. The weather strip (2) comprises a fin portion (4) formed in a die molded part (3) of the weather strip (2) to cover existing holes (1b) or mounting holes (1a) formed in the panel (1), an insert plate (6) mounted in the fin portion (4), a locking projection (7) protrudely formed from the insert plate (6) and projects out of the fin portion (4), and an engagement member (8) attached to the locking projection (7) capable of disconnecting. The engagement member (8) is inserted into a existing hole (1b) or a mounting hole (1a) formed in the panel (1) for an engagement and to mount the weather strip (2) on the panel (1).

Further, a second aspect of the invention provides a mounting structure of a weather strip claimed in claim 1, wherein the engagement member (8) is provided with locking parts (8a) for engagements capable of disconnecting with the existing hole (1b) or mounting hole (1a) formed in the panel (2).

Further, a third aspect of the invention provides a mounting structure of a weather strip claimed in claim 1 or 2, wherein the fin portion (4) and the locking projection (7) are made of hard rubber material of hard resin material instead of comprising the insert plate (6).

Still further, a fourth aspect of the invention provides a mounting structure of a weather strip claimed in claim 2 or 3, wherein the locking projection (7) comprises a periphery groove (7a) in an outer circumference surface of a column-like body forming the locking projection (7). The engagement member (8) is provided with a plural number of inner projections (8b) formed in an inner circumference surface of a ring-like body forming the engagement member (8) for an engagement with the periphery groove (7). The engagement member (8) is also provided with a plural number of locking parts (8a) in an outer circumference surface of the ring-like body forming the engagement member (8).

It should be noted that the each numeral in the corresponding parenthesis indicates a corresponding element or matter described in the drawings and the preferred embodiment of the invention.

According to the mounting structure of a weather strip provided in the first aspect of the invention, the engagement member is attached to the locking projection of the insert plate which projects out of the fin portion of the weather strip, and the engagement member is inserted into the existing hole such as an access hole or the mounting hole formed in the panel in order to mount the weather strip on the panel, so that the engagement member can be placed between the fin portion and the panel not exposing the engagement member after the weather strip is mounted on the panel of an automobile. Therefore, an outlook of the structure is not deteriorated.

Further, the engagement member is inserted into the existing hole or mounting hole of the panel, so that the engagement member functions in accurately placing the weather strip in a proper position, and that the weather strip can be mounted on a right position on the panel.

Further, according to the second aspect of the invention, in addition to the effects of the first aspect of the invention, the engagement member is provided with the locking parts which engage with the existing hole or the mounting hole of the panel, so that the weather strip can be firmly mounted on the panel and that the weather strip is prevented from being removed by an influence of an unexpected force.

It should be noted that the engagement member is capable of disconnecting from both the locking projection and the existing hole or the mounting hole, so that when an access hole has to be exposed at the time, for example, an elevation mechanism of a door glass is repaired, the weather strip can be easily removed from the panel and it is easily remounted on the panel.

Further, according to the third aspect of the invention, in addition to the first and second aspects of the inventions, the fin portion and the locking projection are made of hard rubber material or hard resin material, so that a production processes as well as a mounting process of the insert plate become unneeded, and that the productivity can be improved.

Moreover, according to the fourth aspect of the invention, in addition to the inventions claimed in claims 2 and 3, the engagement member is formed by providing a plural number of inner projections in the inner circumference surface of the ring-like body of the engagement member to engage with the periphery groove of the locking projection, and by providing a plural number of locking parts in the outer circumference surface of the ring-like body of the engagement member to engage with the existing hole or the mounting hole formed in the panel, so that the weather strip can be mounted on the panel more easily and more firmly.

BRIEF DESCRIPTION OF THE INVENTION

Figure 7:
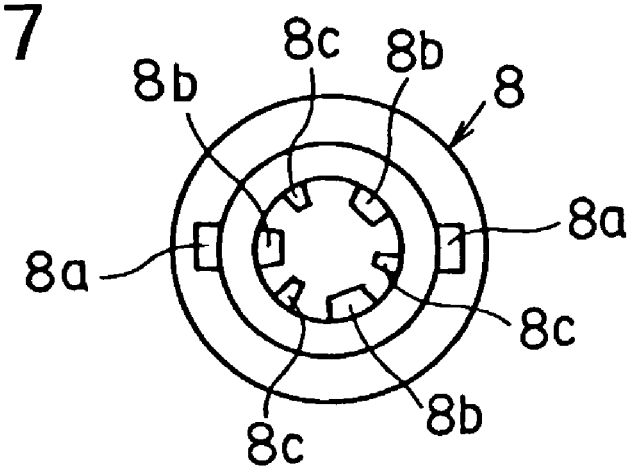
FIG. 7 is a plan view showing the engagement member according to the preferred embodiment of the invention.
Figure 8:
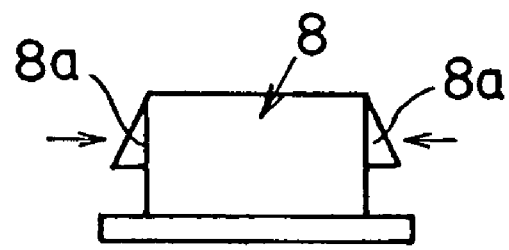
FIG. 8 is a front view showing the engagement member shown in FIG. 7.
Figure 9:
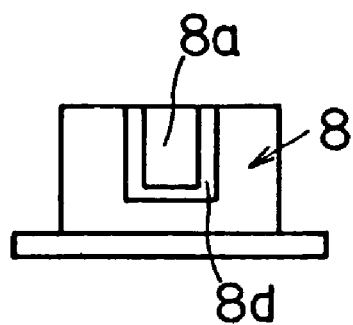

and, FIG. 9 is a side view showing the engagement member shown in FIG. 7.

DETAILED DESCRIPTION OF THE INVENTION

Referring to FIGS. 1 to 5, there will be described a preferred embodiment of a mounting structure of a weather strip according to the invention.

Figure 1:
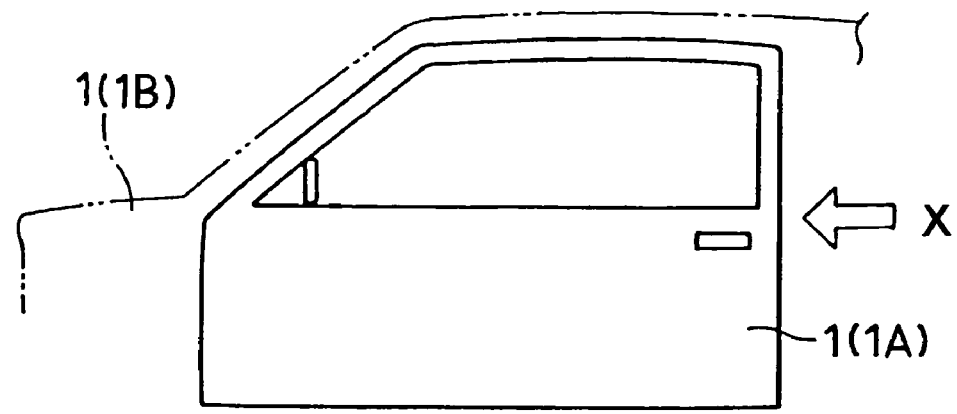
FIG. 1 is a side elevation view showing a door panel of an automobile forming a mounting structure of a weather strip according to the preferred embodiment of the invention.
Figure 2:
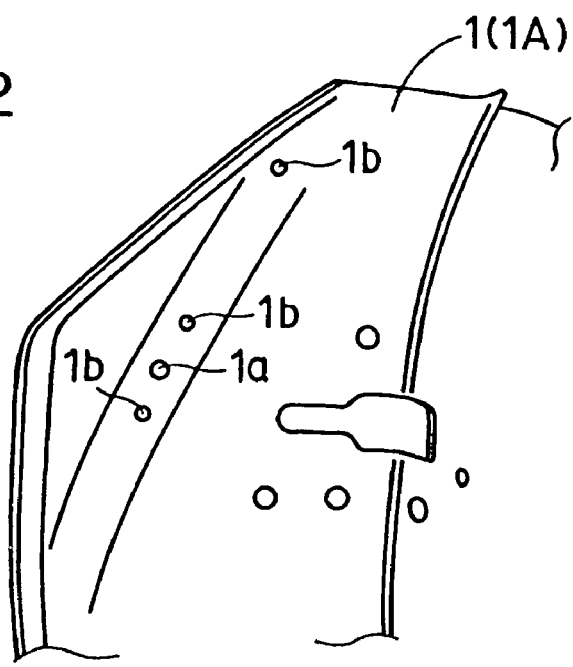
FIG. 2 is a back view showing a door panel viewed from the direction indicated with the arrow "X" in FIG. 1.
Figure 3:
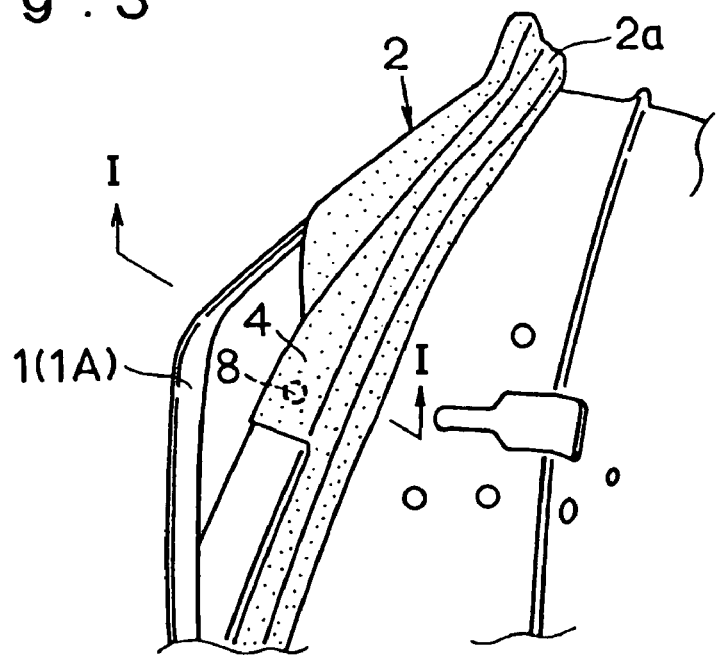
FIG. 3 is a back view showing a structure wherein a weather strip is mounted on the door panel which is shown in FIG. 2.
Figure 4:
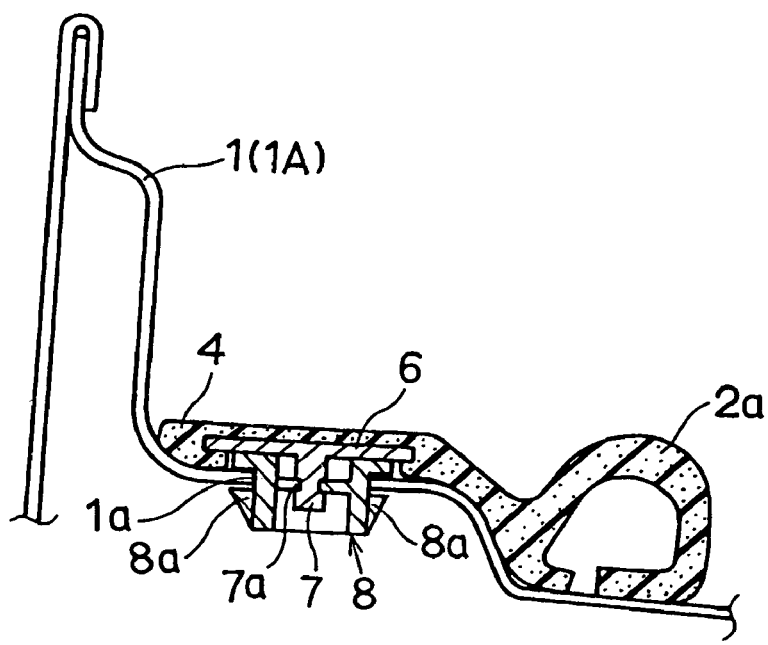
FIG. 4 is a sectional view along line I—I in FIG. 3.
Figure 5:
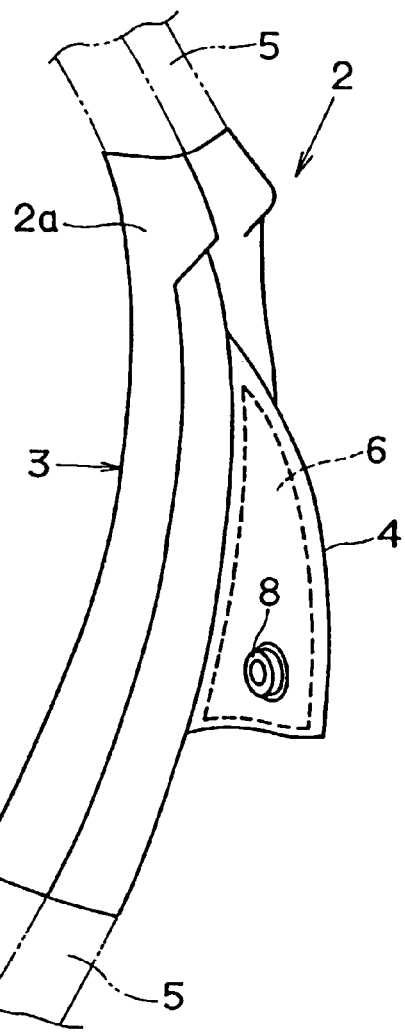
FIG. 5 is a back view showing a weather strip comprised with an engagement member according to the preferred embodiment of the invention.

FIG. 1 is a side view showing a door panel 1A of an automobile comprising a mounting structure of a weather strip according to the preferred embodiment of the invention. FIG. 2 is a back view showing the door panel 1A viewed from the direction indicated with the arrow "X" in FIG. 1. FIG. 3 is a back view showing a structure in which a weather strip 2 is mounted on the door panel 1A. FIG. 4 is a sectional view along line I—I in FIG. 3. FIG. 5 is a back view showing a weather strip in combination with an engagement member.

In this mounting structure of a weather strip, a weather strip 2 is mounted on a rear end portion of a door panel 1A of an automobile, wherein a fin portion 4 formed in a die molded part of the weather strip 2 is arranged to cover a mounting hole 1a formed in the door panel 1A.

The weather strip 2 comprises extrusion molded parts 5 integrally formed at both ends of the die molded part 3, wherein a hollow portion 2a, which is continuously formed through the die molded part 3 and the extrusion molded part 5, is making a resilient contact with a body panel 1B to seal a gap between the door panel 1A and the body panel 1B. The weather strip 2, except the fin portion 4 thereof, is secured to the body panel 1B with clips or double-sided adhesive tapes.

An insert plate 6 made of hard resin material is embedded in the fin portion 4 of the die molded part 3, which is provided with a locking projection 7 and is protrudely formed from the fin portion 4 and is exposed out of the fin portion 4. An engagement member 8 is attached to the locking projection 7 capable of disconnecting. The engagement member 8 is inserted into a mounting hole 1a formed in a door panel 1A, which is also used as an access hole for regulating an adjusting mechanism provided inside a door, thereby mounting the weather strip 2 on the door panel 1A. In this embodiment, the area in the surface of the insert plate 6 surrounding the locking projection 7, where the engagement member 8 makes a contact, is also exposed, like the locking projection 7. The invention includes such a technical scope that the engagement member 8 can be inserted into any existing hole 1b instead of the mounting hole 1a. Further, the insert plate 6 may be sandwiched inside the fin portion 4 instead of being embedded in the fin portion 4 in a manner not to be viewed from outside after the weather strip 2 is mounted on the door panel 1A of an automobile.

Figure 6:
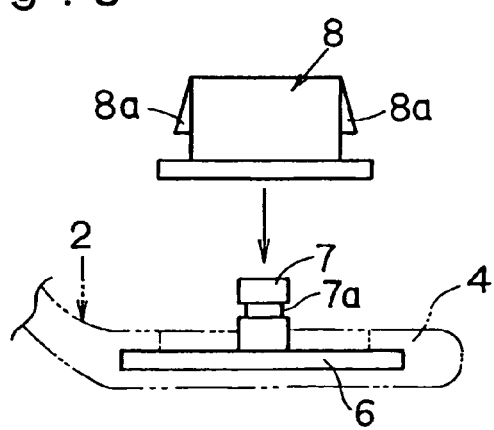
FIG. 6 is a front view showing a locking projection and an engagement member in a disassembled manner according to the preferred embodiment of the invention.

As illustrated in FIG. 6, according to this preferred embodiment of the invention, the locking projection 7 is provided with a periphery groove 7a around the outer circumference surface of the column-like body forming the locking projection 7. Further, as illustrated in FIGS. 6 to 9, the engagement member 8 is provided with a plural number of inner projections 8b in the inner circumference surface of the ring-like body forming the engagement member 8, to carry out engagements with the periphery groove 7a of the locking projection 7. The engagement member 8 is also provided with a plural number of locking parts 8a in the outer circumference surface of the ring-like body forming the engagement member 8 for engagements with the mounting hole 1a of the door panel 1A, capable of disconnecting. Each locking part 8a elastically deforms in a corresponding open space 8d having the upper end portion thereof as a base of the deformation. There are provided supporting projections 8c between the inner projections 8b of the engagement member 8 in order to stabilize a mounting posture of the engagement member 8 in relative to the locking projection 7.

In this preferred embodiment of the invention, a mounting operation of the weather strip 2 can be carried out in the following manner.

First, the engagement member 8 of the insert plate 6, which projects out of the fin portion 4 of the weather strip 2, is attached to the locking projection 7. This attachment operation is performed by engaging the inner projections 8b provided in the inner periphery surface of the engagement member 8 with the periphery groove 7a provided to the locking projection 7.

Secondly, the engagement member 8 attached to the fin portion 4 of the weather strip 2 is inserted into the mounting hole 1a formed in the door panel 1A, engaging the plural number of locking parts 8a provided in the outer peripheral surface of the engagement member 8 with the mounting hole 1a which is used as an access hole as well. By doing so, the fin portion 4 of the weather strip 2 is accurately secured to a right position, and the mounting hole 1a can be assuredly covered by the fin portion 4.

Further, the engagement member 8 is able to take a position between the fin portion 4 and the door panel 1A, so that the engagement member 8 is not viewed from an outside, and that an outlook thereof is good.

In this preferred embodiment of the invention, although the weather strip 2 is mounted on the door panel 1A, the invention is not limited to such structure and the weather strip 2 can be mounted on a body panel 1B to cover any hole, e.g., a mounting hole.

Further, according to the invention, the fin portion 4 and the locking projection 7 can be made of a hard rubber material or hard resin material instead of providing the insert plate 6. By providing such structure, it is unneeded to produce the insert plate 6, and it is also unneeded to mount the insert plate 6 in the die molded part 3 of the weather strip 2. Therefore, the production cost as well as the production process can be reduced, thereby improving the productivity.

What is claimed is:

1. A mounting structure of a weather strip comprising a weather strip mounted on a door panel or a body panel of an automobile, said weather strip comprising:
   a fin portion formed in a die molded part of said weather strip to cover existing holes or mounting holes formed in said panel;
   an insert plate mounted in said fin portion;
   a locking projection protrudely formed from said insert plate and projecting out of said fin portion; and
   an engagement member attached to said locking projection and being capable of disconnecting therefrom,
   wherein said engagement member is inserted into an existing hole or a mounting hole formed in said panel for an engagement and to mount said weather strip on said panel.

2. A mounting structure of a weather strip as claimed in claim 1, wherein said engagement member includes locking parts for engagement capable of disconnecting with said existing hole or mounting hole formed in said panel.

3. A mounting structure of a weather strip as claimed in claim 2, wherein:
   said locking projection comprises a periphery groove in an outer circumference surface of a column-like body forming said locking projection;
   said engagement member is provided with a plural number of inner projections formed in an inner circumference surface of a ring-like body forming said engagement member for an engagement with said periphery groove; and
   said engagement member is provided with a plural number of said locking parts in an outer circumference surface of said ring-like body forming said engagement member.

4. A mounting structure of a weather strip as claimed in claim 1, wherein:
   said locking projection comprises a periphery groove in an outer circumference surface of a column-like body forming said locking projection;
   said engagement member is provided with a plural number of inner projections formed in an inner circumference surface of a ring-like body forming said engagement member for an engagement with said periphery groove; and
   said engagement member is provided with a plural number of said locking parts in an outer circumference surface of said ring-like body forming said engagement member.

* * * * *